United States Patent
Inagaki et al.

(10) Patent No.: US 6,625,362 B2
(45) Date of Patent: Sep. 23, 2003

(54) DISPERSION COMPENSATING OPTICAL FIBER

(75) Inventors: Shinya Inagaki, Kawasaki (JP); Tomoaki Takeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 09/765,419

(22) Filed: Jan. 22, 2001

(65) Prior Publication Data

US 2002/0006256 A1 Jan. 17, 2002

(30) Foreign Application Priority Data

Jul. 14, 2000 (JP) ........................................ 2000-213811

(51) Int. Cl.⁷ ................................................ G02B 6/22
(52) U.S. Cl. ........................... 385/127; 385/123; 385/29
(58) Field of Search ................................. 385/123, 124, 385/126, 127, 28, 29

(56) References Cited

U.S. PATENT DOCUMENTS

| | | | |
|---|---|---|---|
| 4,176,911 A | * | 12/1979 | Marcatili et al. |
| 5,740,297 A | * | 4/1998 | Onishi et al. ............... 385/127 |
| 5,999,679 A | * | 12/1999 | Antos et al. ................ 385/127 |
| 6,263,138 B1 | * | 7/2001 | Sillard et al. ............... 385/123 |
| 6,327,403 B1 | * | 12/2001 | Danziger et al. ............ 385/29 |
| 6,445,864 B2 | * | 9/2002 | Jiang et al. ................. 385/127 |

FOREIGN PATENT DOCUMENTS

| | | |
|---|---|---|
| EP | 0598554 A1 * | 5/1994 |
| JP | 6-222235 | 8/1994 |
| JP | 7-261048 | 10/1995 |
| JP | 7-270636 | 10/1995 |
| JP | 8-136758 | 5/1996 |
| JP | 8-313750 | 11/1996 |
| JP | 9-318833 | 12/1997 |
| JP | 10-253847 | 9/1998 |
| JP | 10-300965 | 11/1998 |
| JP | 11-95056 | 4/1999 |
| JP | 11-507445 | 6/1999 |
| JP | 2000-47048 | 2/2000 |

OTHER PUBLICATIONS

Onishi, et al., "Third–order Dispersion Compensating Fibres for Non–Zero Dispersion Shifted Fibre Links", *Electronics Letters*, vol. 32, No. 25, pp. 2344–2345, Dec. 1996.

* cited by examiner

*Primary Examiner*—Rodney Bovernick
*Assistant Examiner*—Mike Stahl
(74) *Attorney, Agent, or Firm*—Staas & Halsey LLP

(57) ABSTRACT

The present invention aims at realizing a dispersion compensating optical fiber having a negative wavelength dispersion and a negative dispersion slope and exhibiting a large slope rate, and at providing a dispersion compensating optical fiber having a function to eliminate higher mode optical components. To this end, the dispersion compensating optical fiber according to the present invention includes a core portion, a low refractive index portion having a refractive index lower than that of the core portion, and an intermediate refractive index portion having a refractive index higher than that of the low refractive index portion and lower than that of the core portion; in which the refractive index of the intermediate refractive index portion is increased so as to reduce the nominal specific refractive index of the low refractive index portion; a value obtained by subtracting a specific refractive index difference of the intermediate refractive index portion from a specific refractive index difference of the low refractive index portion is set to be −0.8% or less; and a value obtained by subtracting the specific refractive index difference of the intermediate refractive index portion from a specific refractive index difference of the core portion is set to be 1.5% or more; to thereby set the slope rate of the dispersion compensating optical fiber to be 0.01 or more.

9 Claims, 7 Drawing Sheets

DISPERSION COMPENSATING OPTICAL FIBER

BACKGROUND OF THE INVENTION

1. Field of the Invention

The present invention relates to a dispersion compensating optical fiber for compensating for wavelength dispersion and a dispersion slope of an optical transmission path in an optical communication system, and particularly to a dispersion compensating optical fiber for achieving an increased slope rate.

2. Related Art

In an optical communication system, there is a case where an optical signal of 1.55 μm wavelength band is transmitted over a long distance, through an optical transmission path such as constituted of a single mode fiber (SMF) which exhibits zero-dispersion near 1.3 μm wavelength. In such a case, the optical transmission path has wavelength dispersion on the order of about 16 ps/nm/km for the optical signal of 1.55 μm band, resulting in a problem that the transmission of optical signal over a long distance at a high speed leads to accumulation of wavelength dispersion to thereby distort the waveform of the optical signal. For example, if an optical signal is transmitted over a distance of 100 km, a positive wavelength dispersion of about 1,600 ps/nm is accumulated, thereby requiring compensation therefor. Further, when a wavelength division multiplexing (WDM) transmission is performed using the aforementioned optical transmission path, it is also required to compensate for a dispersion slope of the optical transmission path. Concretely, it is known that a 1.3 μm zero-dispersion SMF has a positive dispersion slope on the order of about 0.05 ps/nm²/km.

Conventionally, to compensate for the wavelength dispersion of an optical transmission path having such a positive wavelength dispersion and a positive dispersion slope, there has been utilized a dispersion compensating optical fiber (DCF) having a negative wavelength dispersion and a negative dispersion slope. As conventional dispersion compensating optical fibers, various structures have been concretely proposed.

For example, there has been disclosed a basic structure having a "W" shaped refractive index profile as shown in FIG. 8 in the conventional dispersion compensating optical fibers such as described in Japanese Unexamined Patent Publication Nos. 7-261048, 8-136758, 8-313750, 10253847, 9-318833 and 11-95056. Concretely, the conventional dispersion compensating optical fiber has the basic structure wherein a low refractive index portion 52 is formed on the periphery of a core portion 51 positioned at the center of the optical fiber, and a cladding portion 53 is formed on the periphery of the low refractive index portion 52. The core portion 51 has a high refractive index of which specific refractive index difference to pure silica is a positive value, and the low refractive index portion 52 has a low refractive index of which specific refractive index difference refractive index is a negative value to pure silica, while the cladding portion 53 is formed of pure silica (i.e., its specific refractive index difference is zero). By forming the basic structure in such a "W" shaped refractive index profile, a dispersion compensating optical fiber having a negative wavelength dispersion and a negative dispersion slope is realized.

Further, as shown in FIG. 9, there has been also disclosed a structure wherein, in the cladding portion 53, a part adjacent to the low refractive index portion 52 has a slightly high refractive index in the "W" shaped refractive index profile, in conventional dispersion compensating optical fibers such as described in Japanese Unexamined Patent Publication Nos. 2000-47048, 6-222235, 7-270636, 11-507445 and 10300965. By forming such a structure, there is realized a dispersion compensating optical fiber capable of such as reducing transmission loss.

Meantime, in many cases, there is adopted a dispersion shifted fiber (DSF) as an optical transmission path in an optical communication system for transmitting an optical signal of 1.55 μm band over a long distance. This DSF is an optical fiber obtained by shifting the zero-dispersion wavelength of the 1.3 μm zero-dispersion SMF to the 1.55 μm band and being specialized in optical transmission in 1.55 μm band where the transmission loss of silica optical fiber becomes a minimum. However, when performing a WDM transmission in 1.55 μm band through an optical transmission path adopting a DSF, the smaller wavelength dispersion in 1.55 μm band rather leads to a defective susceptibility to a nonlinear optical effect. As such, there has been proposed a system utilizing a non-zero dispersion shifted fiber (NZ-DSF) wherein the zero-dispersion wavelength of DSF has been intentionally shifted to the outside of a signal light wavelength band. Since such an NZ-DSF has a finite wavelength dispersion and a finite dispersion slope in the signal light wavelength band of 1.55 μm, it is required to compensate for the wavelength dispersion and dispersion slope in a long distance high-speed transmission of a WDM optical signal.

To compensate corresponding to the wavelength dispersion and dispersion slope of the NZ-DSF, there is required a dispersion compensating optical fiber having a large "slope rate" defined by a value obtained by dividing the dispersion slope by the value of the wavelength dispersion compared to the 1.3 μm zero-dispersion SMF. However, it is not easy to achieve an increase in slope rate in the dispersion compensating optical fiber having the aforementioned conventional structure. As one concrete way to increase the slope rate, it is considered to reduce the refractive index of the low refractive index portion 52. According to the technique to date, however, it is difficult to reduce the refractive index down to a desired level, due to such as a manufactural problem. Even when a dispersion compensating optical fiber having a greater slope rate corresponding to the NZ-DSF can realized, such a dispersion compensating optical fiber should be so expensive.

Further, in the conventional dispersion compensating optical fiber having the structure as shown in FIG. 9, there are caused light in higher mode propagated through the part with higher refractive index of the cladding portion 53. If this light in higher mode is sent out to the transmission path, then there is caused a problem in that the signal waveform of the transmitted light would be deteriorated.

SUMMARY OF THE INVENTION

The present invention has been carried out in view of the conventional problems as described above, and it is therefore an object of the present invention to provide a dispersion compensating optical fiber having a negative wavelength dispersion and a negative dispersion slope and exhibiting a large slope rate. It is a further object of the present invention to provide a dispersion compensating optical fiber for eliminating higher mode optical components to thereby transmit fundamental mode optical signals only.

To achieve the aforementioned object, one aspect of the dispersion compensating optical fiber according to the present invention includes: a core portion positioned at the center of the optical fiber; a low refractive index portion provided at the periphery of the core portion and having a refractive index lower than that of the core portion; and an intermediate refractive index portion provided at the periphery of the low refractive index portion and having a refractive index higher than that of the low refractive index portion and lower than that of the core portion, and has a negative wavelength dispersion and a negative dispersion slope, wherein the intermediate refractive index portion is formed by doping to pure silica a dopant for increasing a refractive index such that a first specific refractive index difference ($\Delta 3$) thereof relative to pure silica has a positive value, the low refractive index portion is formed by doping to pure silica a dopant for reducing a refractive index such that a value obtained by subtracting the first specific refractive index difference ($\Delta 3$) of the intermediate refractive index portion from a second specific refractive index difference ($\Delta 2$) relative to pure silica becomes −0.8% or less, the core portion is formed by doping to pure silica a dopant for increasing a refractive index such that a value obtained by subtracting the first specific refractive index difference ($\Delta 3$) of the intermediate refractive index portion from a third specific refractive index difference ($\Delta 1$) relative to pure silica becomes 1.5% or more, and a slope rate obtained by dividing the dispersion slope by a value of the wavelength dispersion becomes 0.01 or more.

According to the dispersion compensating optical fiber having such a constitution, the refractive index of the intermediate refractive index portion is raised so as to reduce the nominal specific refractive index of the low refractive index portion, to thereby obtain an effect identically with the situation where the refractive index of the low refractive index portion is reduced. Further, the value ($\Delta 2$-$\Delta 3$) obtained by subtracting the first specific refractive index difference ($\Delta 3$) of the intermediate refractive index portion from the specific second specific refractive index difference ($\Delta 2$) of the low refractive index portion is rendered to be −0.8% or less, and the value ($\Delta 1$-$\Delta 3$) obtained by subtracting the first specific refractive index difference ($\Delta 3$) of the intermediate refractive index portion from the third specific refractive index difference ($\Delta 1$) of the core portion is rendered to be 1.5% or more, to thereby allow the slope rate to be 0.01 or more without further reducing the refractive index of the low refractive index portion. In this way, it becomes possible to readily realize a dispersion compensating optical fiber suitable for compensating for a wavelength dispersion and a dispersion slope of such as an NZ-DSF, at a reduced cost.

Further, another aspect of the dispersion compensating optical fiber according to the present invention includes: a core portion positioned at the center of the optical fiber; a low refractive index portion provided at the periphery of the core portion and having a refractive index lower than that of the core portion; and an intermediate refractive index portion provided at the periphery of the low refractive index portion and having a refractive index higher than that of the low refractive index portion and lower than that of the core portion, and has a negative wavelength dispersion and a negative dispersion slope, wherein the dispersion compensating optical fiber further comprises a higher mode light eliminating portion for eliminating higher mode optical components propagated through the intermediate refractive index portion.

According to such a constitution, higher mode optical components propagated through the intermediate refractive index portion are eliminated by the higher mode light eliminating portion. In this way, only the fundamental mode optical signal can be sent out to the transmission path connected to the dispersion compensating optical fiber, to thereby allow the reduction of waveform deterioration in transmitted light.

Further, in the aforementioned dispersion compensating optical fiber having the higher mode light eliminating portion, the constitution may be such that the intermediate refractive index portion is formed by doping to pure silica a dopant for increasing a refractive index such that a first specific refractive index difference ($\Delta 3$) thereof relative to pure silica has a positive value, the low refractive index portion is formed by doping to pure silica a dopant for reducing a refractive index such that a value obtained by subtracting the first specific refractive index difference ($\Delta 3$) of the intermediate refractive index portion from a second specific refractive index difference ($\Delta 2$) relative to pure silica becomes −0.8% or less, the core portion is formed by doping to pure silica a dopant for increasing a refractive index such that a value obtained by subtracting the first specific refractive index difference ($\Delta 3$) of the intermediate refractive index portion from a third specific refractive index difference ($\Delta 1$) relative to pure silica becomes 1.5% or more, and a slope rate obtained by dividing the dispersion slope by a value of the wavelength dispersion value becomes 0.01 or more.

According to the dispersion compensating optical fiber having such a constitution, the refractive index of the intermediate refractive index portion is raised so as to reduce the nominal specific refractive index of the low refractive index portion, the value ($\Delta 2$-$\Delta 3$) is rendered to be −0.8% or less, and the value ($\Delta 1$-$\Delta 3$) is rendered to be 1.5% or more, to thereby allow the slope rate to be 0.01 or more without further reducing the refractive index of the low refractive index portion. In this way, it becomes possible to readily realize a dispersion compensating optical fiber suitable for compensating for a wavelength dispersion and a dispersion slope of such as an NZ-DSF, at a reduced cost.

Moreover, in the aforementioned dispersion compensating optical fiber, the higher mode light eliminating portion may be formed by continuously forming the intermediate refractive index portion up to the outermost layer of the optical fiber, to thereby eliminate higher mode optical components.

In this way, by continuously forming the intermediate refractive index portion having a raised refractive index up to the outermost layer of the fiber, those higher mode optical components propagated through the intermediate refractive index portion become extremely susceptible to a bend loss so that the higher mode optical components are eliminated by leaking to the outside of the dispersion compensating optical fiber.

Further, when the aforementioned dispersion compensating optical fiber includes a cladding portion, which is provided at the periphery of the intermediate refractive index portion and has a refractive index lower than that of the intermediate refractive index portion, the higher mode light eliminating portion may be formed by connecting, to a predetermined position, an optical path having a mode field diameter smaller than that of an optical transmission path to which the dispersion compensating optical fiber is connected, so as to eliminate higher mode optical components. Moreover, the optical path preferably has a mode field diameter smaller than an inner diameter of the intermediate refractive index portion.

According to such a constitution, when an optical signal sent from a preceding optical transmission path is input into the dispersion compensating optical fiber, higher mode optical components are propagated through the intermediate refractive index portion. However, these higher mode optical components are sent to an area outside the mode field of a succeeding optical transmission path, by passing through the optical path of the higher mode light eliminating portion. In this way, the higher mode optical components are eliminated from the optical signal passed through the dispersion compensating optical fiber, so that only the fundamental mode optical signal is transmitted to the succeeding optical transmission path.

Further, when the dispersion compensating optical fiber includes a cladding portion, which is provided at the periphery of the intermediate refractive index portion and has a refractive index lower than that of the intermediate refractive index portion, the higher mode light eliminating portion may be formed by setting a refractive index of the periphery portion of the intermediate refractive index portion to be higher than that of the remaining portion of the intermediate refractive index portion, to thereby eliminate higher mode optical components.

According to such a constitution, higher mode optical components propagated through the intermediate refractive index portion tend to travel the periphery portion having the higher refractive index. Since the periphery portion of the intermediate refractive index portion is at a position separated from the core portion, higher mode optical components are sent to an area outside the mode field of a succeeding optical transmission path. In this way, the higher mode optical components are eliminated from the optical signal passed through the dispersion compensating optical fiber, so that only the fundamental mode optical signal is transmitted to the succeeding optical transmission path.

Alternatively, when the dispersion compensating optical fiber includes a cladding portion, which is provided at the periphery of the intermediate refractive index portion and has a refractive index lower than that of the intermediate refractive index portion, the higher mode light eliminating portion may be formed by providing the intermediate refractive index portion with an absorber for absorbing light of 1.55 μm band, to thereby eliminate higher mode optical components. Concretely, the absorber may be arranged in an area sufficiently separated from the mode field of the fundamental mode.

Further objects, features and advantages of the present invention will become more apparent from the following description of preferred embodiments when read in conjunction with the accompanying drawings.

DETAILED DESCRIPTION OF THE PREFERRED EMBODIMENT

There will be described hereinafter embodiments according to the present invention, with reference to the accompanying drawings.

Figure 1:
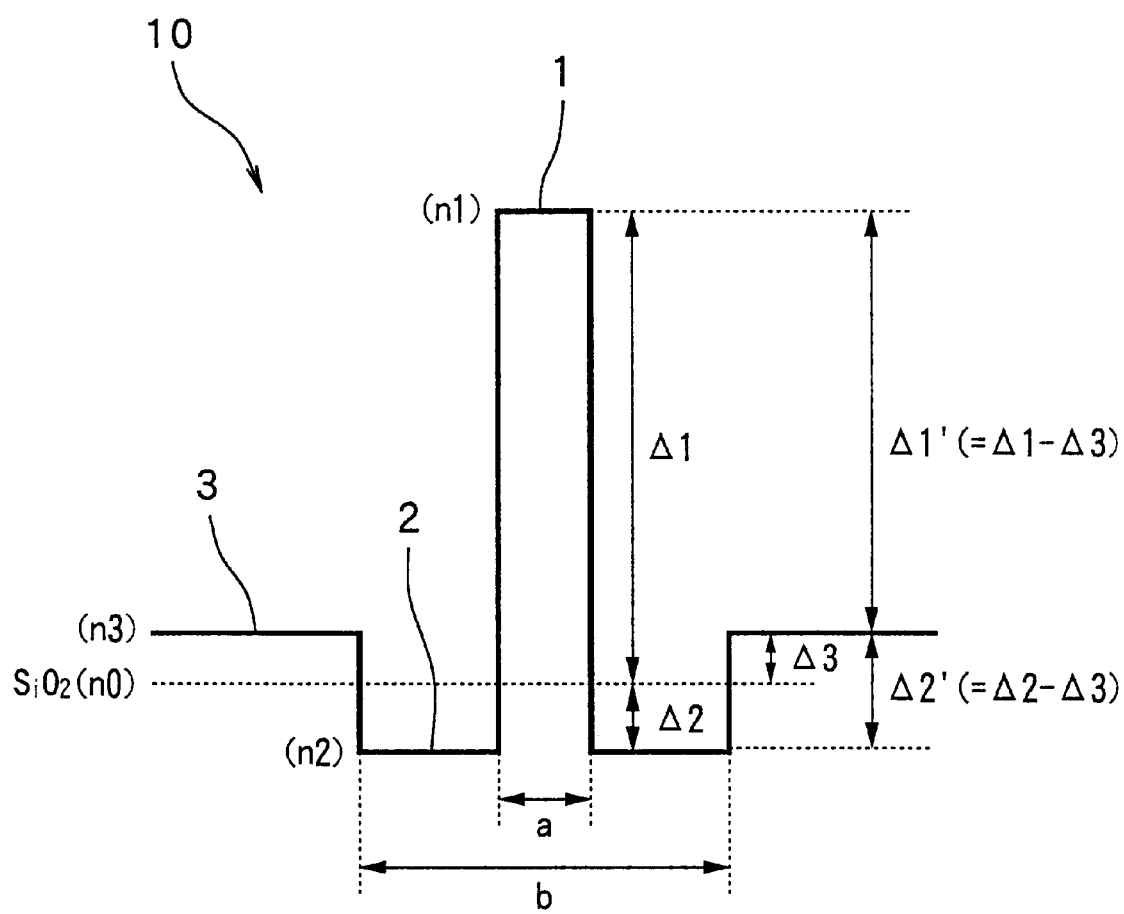
FIG. 1 is a view showing a refractive index profile for explaining a basic structure of a dispersion compensating optical fiber according to the present invention.

FIG. 1 is a view showing a refractive index profile for explaining a basic structure of a dispersion compensating optical fiber according to the present invention.

In FIG. 1, a dispersion compensating optical fiber 10 has a basic structure including a core portion 1 position at the center, a low refractive index portion 2 provided at the periphery of the core portion 1, and an intermediate refractive index portion 3 provided at the periphery of the low refractive index portion 2. Here, assuming that the core portion 1, low refractive index portion 2 and intermediate refractive index portion 3 have refractive indexes n1, n2 and n3, respectively, the magnitude relation among them is n2<n3<n1. As described above, such a type of refractive index profile is known in itself as a general structure of a dispersion compensating optical fiber having a negative wavelength dispersion and a negative dispersion slope. One feature of the present invention resides in that a concrete structure enabling an increase in slope rate (a value obtained by dividing a dispersion slope by a wavelength dispersion) has been made clear without reducing the refractive index of the low refractive index portion 2.

The intermediate refractive index portion 3 is formed by doping, to pure silica ($SiO_2$), such as germanium (Ge) as a dopant for increasing the refractive index such that a specific refractive index difference $\Delta 3$ thereof (first specific refractive index difference) relative to pure silica has a positive value. This refractive index difference $\Delta 3$ can be represented as $\Delta 3 = (n3-n0)/n0$, assuming that the refractive index of pure silica is n0. By increasing the refractive index of the intermediate refractive index portion 3 in this way, the nominal specific refractive index of the low refractive index portion 2 is reduced, thereby obtaining the same effect with the situation where the refractive index of the low refractive index portion 2 is reduced.

The low refractive index portion 2 is formed by doping, to pure silica, such as fluorine (F) as a dopant for reducing the refractive index such that a specific refractive index difference $\Delta P$ thereof (second specific refractive index difference) relative to pure silica has a negative value, and such that a nominal specific refractive index difference $\Delta 2'$ ($=\Delta 2-\Delta 3$) represented by a value obtained by subtracting the specific refractive index difference $\Delta 3$ of the intermediate refractive index portion 3 from the specific refractive index difference $\Delta P$ becomes $-0.8\%$ or less. The specific refractive index difference $\Delta 2$ relative to pure silica is represented as $\Delta 2 = (n2-n0)/n0$. Here, the outer diameter of the low refractive index portion 2 is assumed to be "b".

The core portion 1 is formed by doping, to pure silica, such as germanium as a dopant for increasing the refractive index such that a specific refractive index difference $\Delta 1$ thereof (third specific refractive index difference) relative to pure silica has a positive value, and such that a nominal specific refractive index difference $\Delta 1'$ (=$\Delta 1 - \Delta 3$) represented by a value obtained by subtracting the specific refractive index difference $\Delta 3$ of the intermediate refractive index portion 3 from the specific refractive index difference $\Delta 1$ becomes 1.5% or more. The specific refractive index difference $\Delta 1$ relative to pure silica is represented as $\Delta 1$= (n1−n0)/n0. Here, the outer diameter of the core portion 1 is assumed to be "a".

There will be now explained why the nominal specific refractive index difference $\Delta 2'$ is set to be −0.8% or less and the nominal specific refractive index difference $\Delta 1'$ is set to be 1.5% or more.

Figure 2:
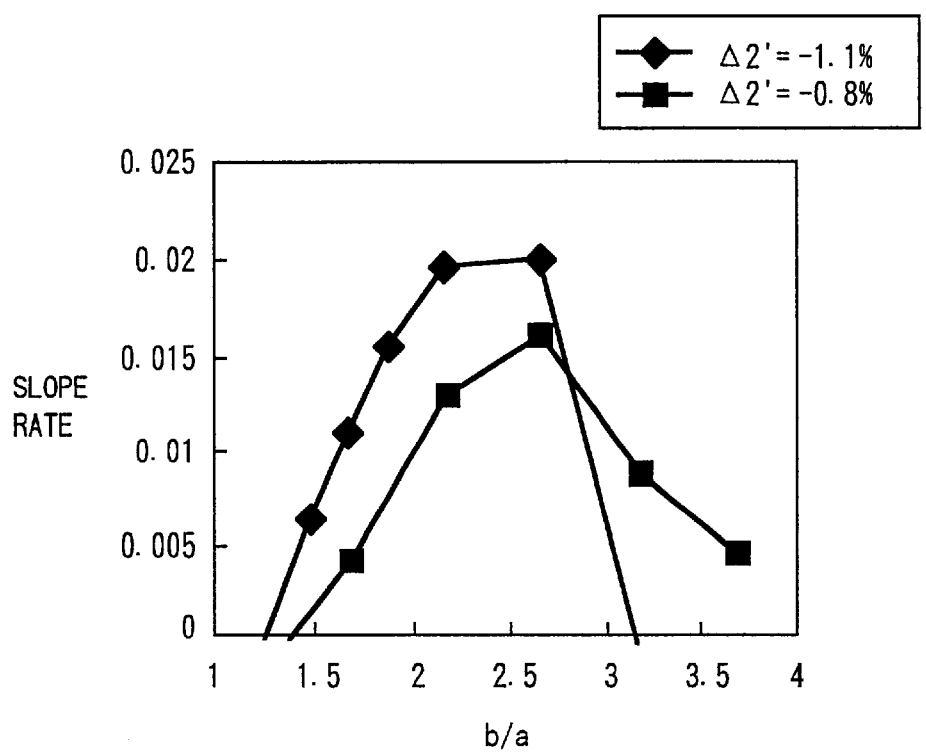
FIG. 2 is a graph illustrating a calculation result of a relationship between a slope rate and b/a, corresponding to $\Delta 2'$.

FIG. 2 is a graph illustrating a calculation result of a relationship between the slope rate of the dispersion compensating optical fiber 10 and the ratio (b/a) of the outer diameter of the low refractive index portion 2 relative to that of the core portion 1, corresponding to the nominal specific refractive index difference $\Delta 2'$. Further, FIG. 3 is a graph illustrating a calculation result of a relationship between the wavelength dispersion of the dispersion compensating optical fiber 10 and the ratio b/a, corresponding to the nominal specific refractive index difference $\Delta 1'$.

As seen from FIG. 2, the slope rate of the dispersion compensating optical fiber 10 is greatly varied, by changing the nominal specific refractive index difference $\Delta 2'$. Generally, it seems necessary to provide a dispersion compensating optical fiber having its slope rate on the order of 0.01 to 0.02, so as to compensate for a wavelength dispersion and a dispersion slope of an NZ-DSF. Considering a range centered around 2.5 as the ratio (b/a) of the outer diameter b of the low refractive index portion 2 relative to the outer diameter a of the core portion 1, there can be realized a large slope rate exceeding 0.01 by setting the nominal specific refractive index difference $\Delta 2'$ to be −0.8% or less.

Figure 3:
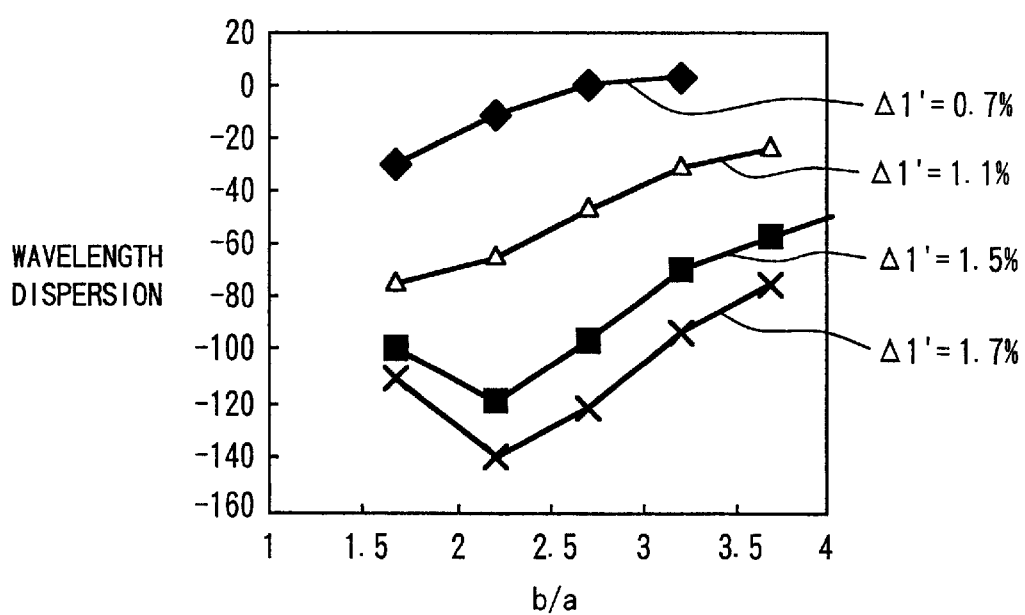
FIG. 3 is a graph illustrating a calculation result of a relationship between a wavelength dispersion and b/a, corresponding to $\Delta 1'$.

Further, as seen from FIG. 3, the wavelength dispersion of the dispersion compensating optical fiber 10 is greatly varied, by changing the nominal specific refractive index difference $\Delta 1'$. Note, it becomes possible to compensate for the wavelength dispersion of the NZ-DSF making use of the dispersion compensating optical fiber 10 of a relatively short length, if there is realized a wavelength dispersion value of −80 ps/nm/km or less. Thus, considering the ratio b/a in a range centered around 2.5 similarly to the above, there can be realized a wavelength dispersion of −80 ps/nm/km or less by setting the nominal specific refractive index difference $\Delta 1'$ to be +1.5% or more.

There will be now described an example of concrete setting values suitable for compensating for the wavelength dispersion and the dispersion slope of the NZ-DSF, for the dispersion compensating optical fiber 10 of the basic structure having the refractive index profile as shown in FIG. 1. Namely, the dispersion compensating optical fiber 10 having the wavelength dispersion of −95 ps/nm/km, dispersion slope of −1.3 ps/nm$^2$/km and slope rate of 0.013, by setting: the specific refractive index difference $\Delta 3$ of the intermediate refractive index portion 3 to be 0.5%; the nominal specific refractive index difference $\Delta 2'$ to be −0.8%, i.e., the specific refractive index difference $\Delta 2$ of the low refractive index portion 2 to be −0.3%; the nominal specific refractive index difference $\Delta 1'$ to be +1.5%, i.e., the specific refractive index difference $\Delta 1$ of the core portion 1 to be 2.0%; the outer diameter a of the core portion 1 to be 3.8 µm; and the outer diameter b of the low refractive index portion 2 to be 8.5 µm (b/a=2.24).

The characteristics of the aforementioned dispersion compensating optical fiber 10 are now compared with those of conventional dispersion compensating optical fibers. For example, in the conventional dispersion compensating optical fiber described in the aforementioned Japanese Unexamined Patent Publication No. 2000-47048, it is defined that the value ($\Delta 2/\Delta 1$) obtained by dividing the specific refractive index difference $\Delta 2$ of a side core layer (corresponding to the low refractive index portion 2) by the specific refractive index difference $\Delta 1$ of a center core (corresponding to the core portion 1) becomes −0.45 or less. Turning to the present invention, there is obtained a value of −0.15 by calculating the $\Delta 2/\Delta 1$ by adopting the aforementioned example. To further reduce the value of $\Delta 2/\Delta 1$, it is necessary to reduce the refractive index of the side core layer or to reduce the refractive index of the center core. Considering that the specific refractive index difference $\Delta 1$ of the center core is defined to be 1.2% or more in the conventional dispersion compensating optical fiber, it can be concluded that the refractive index of the side core layer of the conventional dispersion compensating optical fiber becomes considerably lower than the refractive index of the low refractive index portion 2 according to the present invention. Thus, the basic structure of the dispersion compensating optical fiber according to the present invention appears to be realized in a manner easier than the conventional structure.

According to the basic structure of the dispersion compensating optical fiber of the present invention, it becomes possible to achieve an increase in the slope rate without further reducing the refractive index of the low refractive index portion 2, by increasing the refractive index of the intermediate refractive index portion 3, and by setting the nominal specific refractive index difference $\Delta 2'$ to be −0.8% or less and the nominal specific refractive index difference $\Delta 1'$ to be 1.5% or more. Thus, it becomes possible to realize the dispersion compensating optical fiber 10 suitable for compensating for the wavelength dispersion and the dispersion slope of the NZ-DSF, readily at a lower cost. Further, since the dispersion compensating optical fiber 10 has the wavelength dispersion of −80 ps/nm/km or less, the whole length of the dispersion compensating optical fiber 10 capable of compensating for a required wavelength dispersion accumulated in the NZ-DSF can be shortened as compared with the conventional one.

Meanwhile, since the refractive index of the intermediate refractive index portion 3 of the aforementioned dispersion compensating optical fiber 10 is set to be higher than that of pure silica, there exist higher mode optical components propagated through the intermediate refractive index portion 3. As described in the above, since the transmission of these higher mode optical components to a transmission path results in a factor to deteriorate the signal waveform, it is desired to eliminate such higher mode optical components within the dispersion compensating optical fiber. Thus, there will be described hereinafter an embodiment of a dispersion compensating optical fiber according to the present invention having a function to eliminate the aforementioned higher mode optical components.

Figure 4:
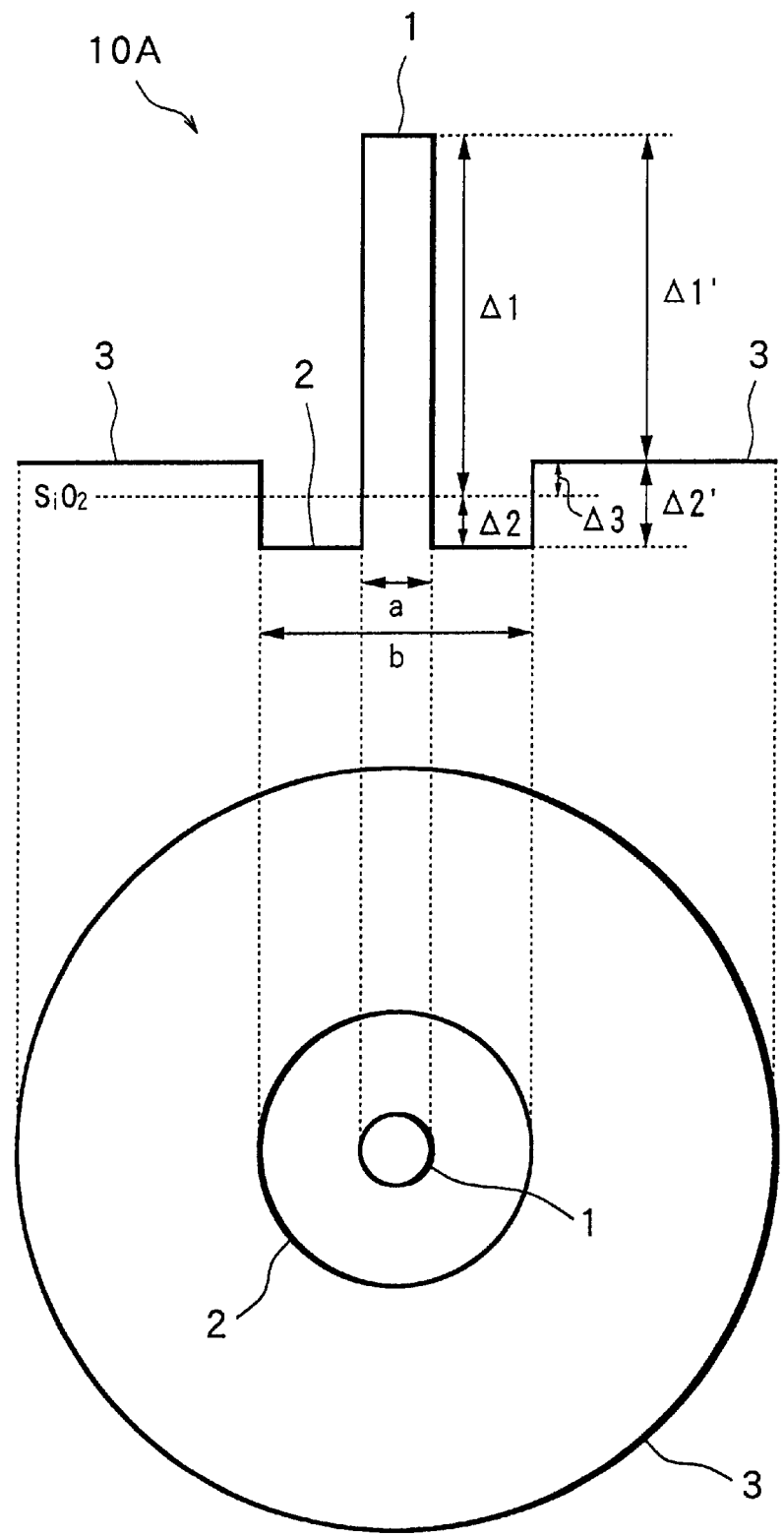
FIG. 4 is a view showing a refractive index profile and a cross-sectional structure for explaining a structure of a first embodiment of the dispersion compensating optical fiber according to the present invention.

FIG. 4 is a view for explaining a structure of a first embodiment of the aforementioned dispersion compensating optical fiber, in which the upper half shows a refractive index profile and the lower half shows a cross-sectional structure of the fiber.

In FIG. 4, a dispersion compensating optical fiber 10A of this embodiment realizes a function to eliminate higher mode optical components, by continuously forming the intermediate refractive index portion 3 up to the outermost layer in the basic structure shown in FIG. 1. In this case, the intermediate refractive index portion 3 is also provided with a function as a higher mode light eliminating portion. The remaining portions other than the above are identical with those of the aforementioned basic structure.

Concretely, the intermediate refractive index portion 3 having a refractive index increased up to n3 by doping such as germanium to pure silica is formed from the periphery of the low refractive index portion 2 to the outermost layer of the optical fiber. The dispersion compensating optical fiber 10A having such a refractive index profile can be manufactured by an MVCD (modified chemical vapor deposition) method using a silica tube such as previously doped with germanium as a starting silica tube.

In the dispersion compensating optical fiber 10A having the aforementioned structure, those higher mode optical components propagated through the intermediate refractive index portion 3 become extremely susceptible to a bend loss, since the intermediate refractive index portion 3 is formed up to the outermost layer of the optical fiber. Thus, for example, by forming the dispersion compensating optical fiber 10A into a coil shape, those higher mode optical components propagated through the intermediate refractive index portion 3 leak to the outside of the dispersion compensating optical fiber 10A, so that only the fundamental mode optical component propagated through the core portion 1 can be transmitted through the transmission path.

Next, there will be described a dispersion compensating optical fiber according to a second embodiment of the present invention, which is provided with a function to eliminate higher mode optical components.

Figure 5:
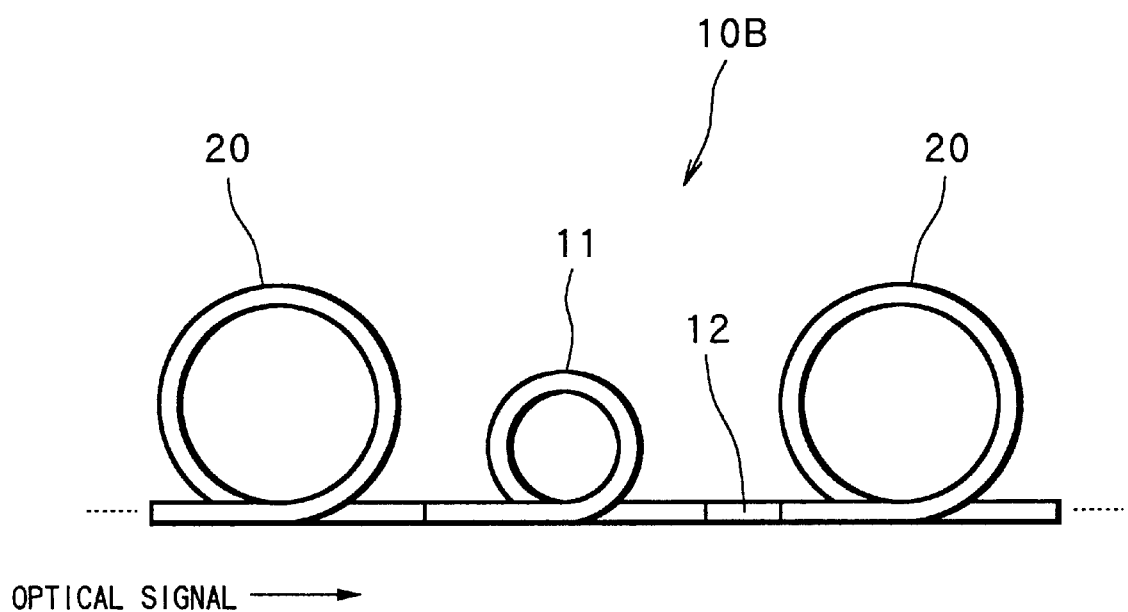
FIG. 5 is a view showing a constitution of a second embodiment of the dispersion compensating optical fiber according to the present invention.

FIG. 5 is a view explaining a constitution of the dispersion compensating optical fiber according to the second embodiment, and shows a situation where the fiber is connected to a transmission path.

In FIG. 5, a dispersion compensating optical fiber 10B is constituted of: a dispersion compensating optical fiber body 11 with one end thereof connected to a transmission path 20 made of such as an NZDSF; and a higher mode light eliminating portion 12 connected to the other end of the dispersion compensating optical fiber body 11. It is assumed here that an optical signal transmitted on the transmission path 20 is input into the dispersion compensating optical fiber body 11 from the one end of the body 11, thereafter sequentially propagated through the dispersion compensating optical fiber body 11 and the higher mode light eliminating portion 12, and then transmitted to another transmission path 20.

Figure 6:
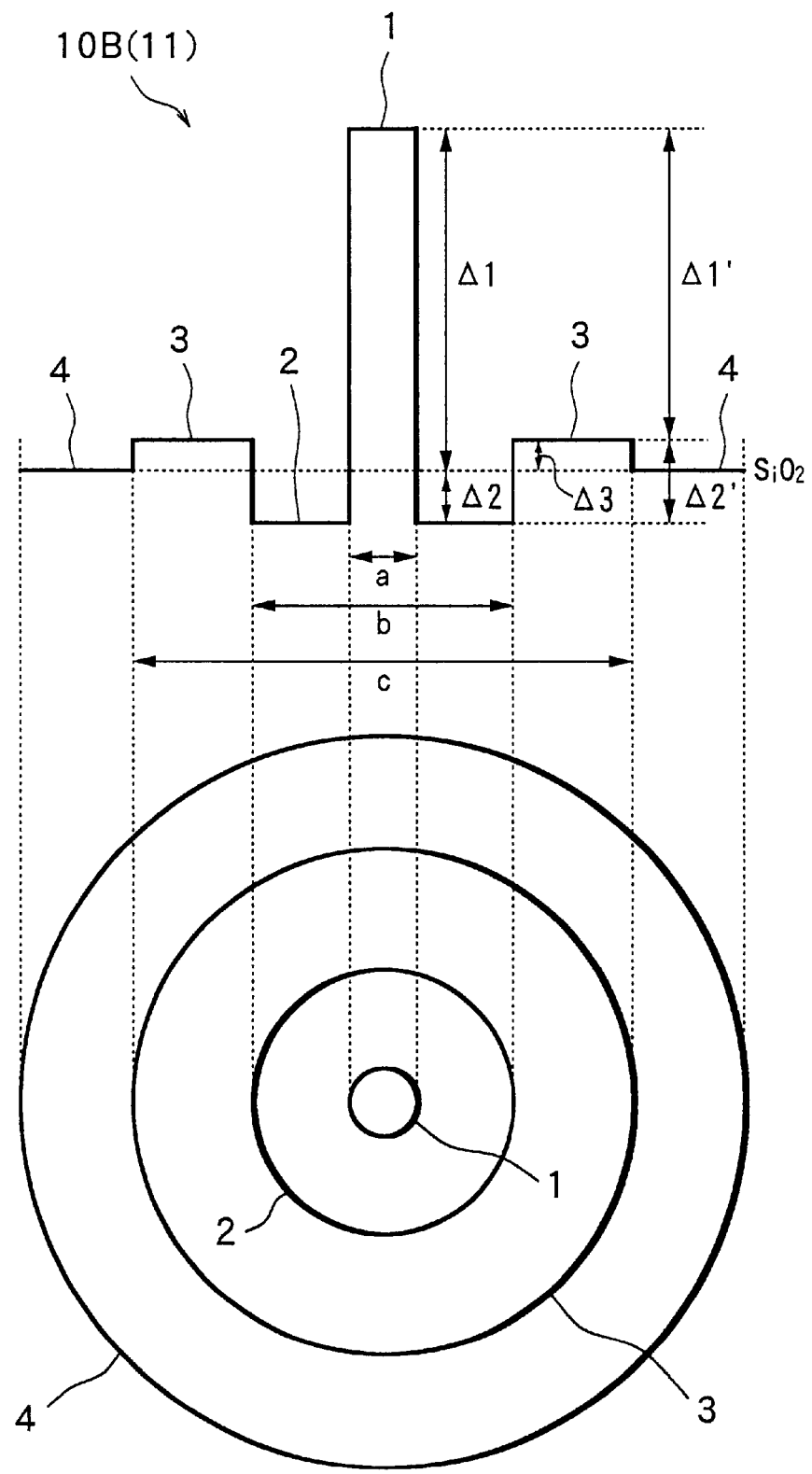
FIG. 6 is a view showing a refractive index profile and a cross-sectional structure for explaining a structure of the dispersion compensating optical fiber in the second embodiment according to the present invention.

FIG. 6 is a view for explaining the structure of the dispersion compensating optical fiber body 11, in which the upper half shows a refractive index profile and the lower half shows a cross-sectional structure of the fiber body.

In FIG. 6, the structure of the dispersion compensating optical fiber body 11 includes a cladding portion 4 outside the periphery of the intermediate refractive index portion 3, in the basic structure shown in FIG. 1. This cladding portion 4 has a refractive index set to be lower than that of the intermediate refractive index portion 3, and is made of pure silica, for example. Further, the periphery of the cladding portion 4 is extended up to the outermost layer of the optical fiber. Here, the outer diameter of the intermediate refractive index portion 3 is supposed to be "c". As a concrete example of this outer diameter c, this outer diameter c of the intermediate refractive index portion 3 can be set at 45.2 $\mu$m, for example, when the outer diameter a of the core portion 1 is 3.8 $\mu$mm and the outer diameter b of the low refractive index portion 2 is 8.5 $\mu$m.

The aforementioned structure is useful when it is difficult to obtain a specialized silica tube previously doped with germanium as explained in the aforementioned first embodiment. Concretely, the dispersion compensating optical fiber having such a structure can be manufactured by adopting pure silica tubes as starting silica tubes, and then sequentially depositing thereon the respective dopants, for the intermediate refractive index portion 3, low refractive index portion 2 and core portion 1.

The higher mode light eliminating portion 12 is constituted of an optical path such as a single mode fiber having a mode field diameter smaller than that of the transmission path 20 to which the higher mode light eliminating portion 12 is connected. It is desirable that the mode field diameter of the higher mode light eliminating portion 12 is equal to or smaller than the outer diameter b of the low refractive index portion 2 of the dispersion compensating optical fiber body 11, and is ideally identical with the outer diameter a of the core portion 1. Here, one end of the higher mode light eliminating portion 12 is assumed to be connected to an output end of the dispersion compensating optical fiber body 11, by such as fusing.

In the aforementioned dispersion compensating optical fiber 10B, when the optical signal from the transmission path 20 is input into the dispersion compensating optical fiber body 11, higher mode optical components are propagated through the intermediate refractive index portion 3. However, these higher mode optical components are sent to a cladding area outside the mode field of the transmission path 20 connected to the higher mode light eliminating portion 12, by passing through the higher mode light eliminating portion 12. In this way, there are eliminated the higher mode optical components from the optical signal passed through the dispersion compensating optical fiber 10B, and only the fundamental mode optical signal is transmitted to the transmission path 20.

In the aforementioned second embodiment, the higher mode light eliminating portion 12 is connected to the output end of the dispersion compensating optical fiber body 11. However, the present invention is not limited thereto. For example, it is possible to insert the higher mode light eliminating portion 12 midway in the dispersion compensating optical fiber body 11. It is also possible to arrange a plurality of higher mode light eliminating portions 12 at a plurality of locations such as midway in and at the output end of the dispersion compensating optical fiber body 11, so as to more assuredly eliminate higher mode optical components.

There will be described hereinafter a third embodiment of the dispersion compensating optical fiber according to the present invention, which is provided with a function to eliminate higher mode optical components.

Figure 7:
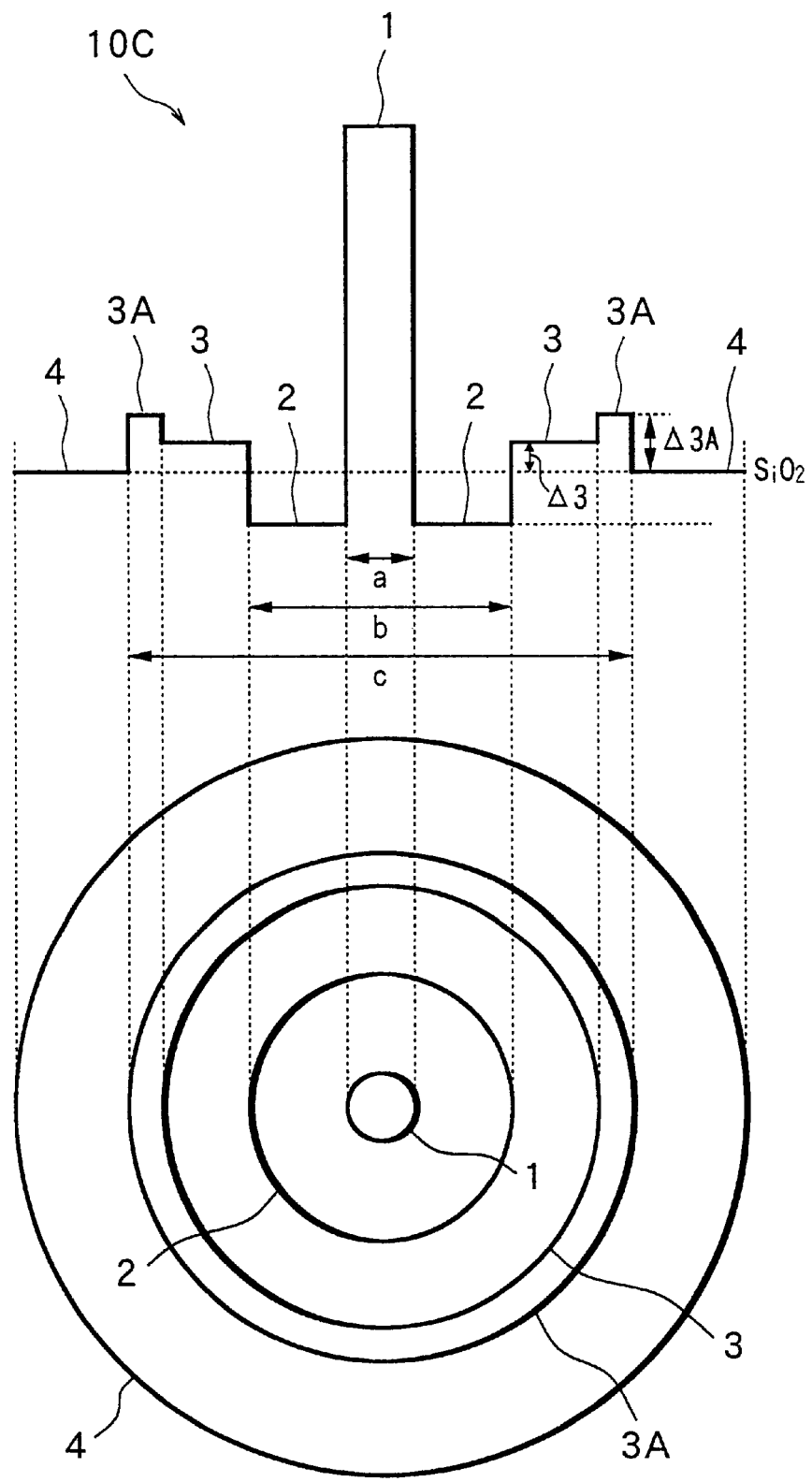
FIG. 7 is a view showing a refractive index profile and a cross-sectional structure for explaining a structure of a third embodiment of the dispersion compensating optical fiber according to the present invention.
Figure 8:
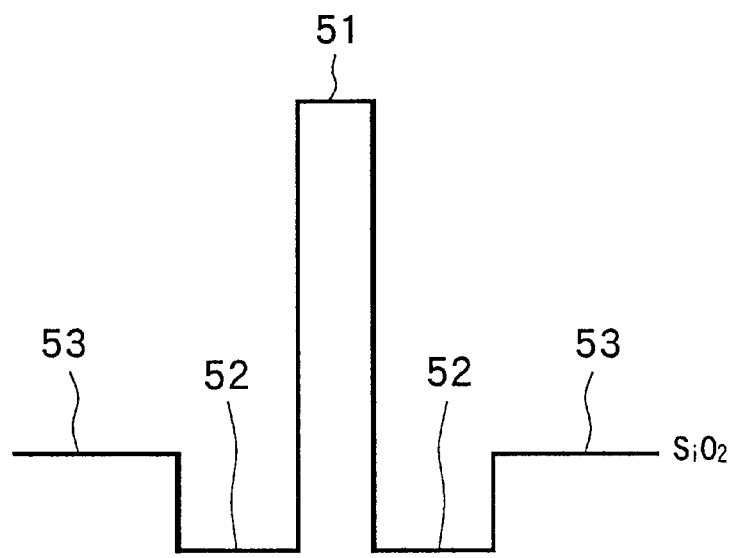
FIG. 8 is a view showing a refractive index profile for explaining a structure of a conventional dispersion compensating optical fiber.
Figure 9:
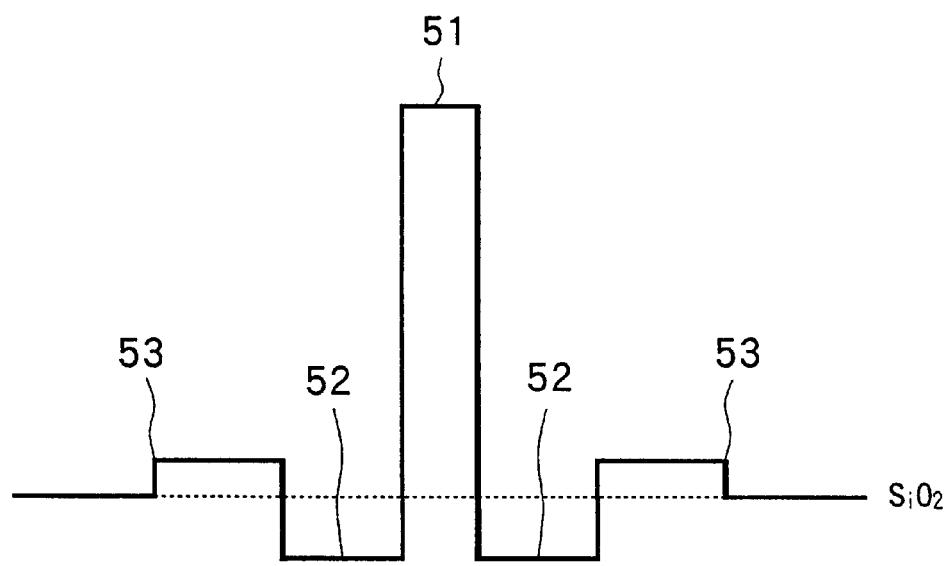
FIG. 9 is a view showing a refractive index profile for explaining a structure of another conventional dispersion compensating optical fiber.

FIG. 7 is a view for explaining a structure of the third embodiment of the aforementioned dispersion compensating optical fiber, in which the upper half shows a refractive index profile and the lower half shows a cross-sectional structure of the fiber.

In FIG. 7, the structure of a dispersion compensating optical fiber 10C includes a cladding portion 4 at the periphery of the intermediate refractive index portion 3, and a high refractive index layer 3A at the periphery of the intermediate refractive index portion 3, in the basic structure shown in FIG. 1, such that the higher refractive index layer 3A has a refractive index higher than that of the intermediate refractive index portion 3.

Similarly to the second embodiment, the cladding portion 4 has a refractive index lower than that of the intermediate refractive index portion 3, and is made of pure silica, for example.

The higher refractive index layer 3A is formed by adjusting the doping amount of a dopant such as germanium, such that the specific refractive index difference Δ3A of the higher refractive index layer 3A relative to pure silica becomes higher than the specific refractive index difference Δ3 of the intermediate refractive index portion 3. For example, it is possible to set the specific refractive index difference Δ3A of the higher refractive index layer 3A to be 0.7% when the specific refractive index difference Δ3 of the intermediate refractive index portion 3 is 0.5%.

In the dispersion compensating optical fiber 10C having the aforementioned structure, higher mode optical components propagated through the intermediate refractive index portion 3 become liable to be propagated through the higher refractive index layer 3A having the higher refractive index. This higher refractive index layer 3A is formed at a position considerably separated from the core portion 1. Thus, even when the transmission path such as utilizing the NZ-DSF is directly connected to the dispersion compensating optical fiber 10C, those higher mode optical components propagated through the higher refractive index layer 3A are sent to the area outside the mode field diameter of the transmission path. As a result, only the fundamental mode optical component propagated through the core portion 1 can be transmitted to the transmission path.

In the aforementioned basic structure and embodiments of the dispersion compensating optical fiber according to the present invention, there has been described the refractive index profiles each having a constant refractive index for the core portion 1. However, the refractive index profile of the core portion 1 in the present invention may be a known profile such as a step-index type, and a graded-index type.

Further, the higher mode light eliminating portion is not limited to the aforementioned constitutions. For example, it is possible to eliminate higher mode optical components, by providing the intermediate refractive index portion with an absorber for absorbing light of 1.55 μm band. In this case, the absorber is preferably arranged in an area sufficiently separated from the mode field of the fundamental mode, and it is possible to adopt erbium as a concrete absorber.

What is claimed:

1. A dispersion compensating optical fiber comprising:
   a core portion positioned at the center of the optical fiber;
   a low refractive index portion provided at the periphery of said core portion and having a refractive index lower than that of the core portion; and
   an intermediate refractive index portion provided at the periphery of said low refractive index portion and having a refractive index higher than that of the low refractive index portion and lower than that of the core portion, and having a negative wavelength dispersion and a negative dispersion slope, wherein
   said dispersion compensating optical fiber further comprises a higher mode light eliminating portion to eliminate all of higher mode optical components propagated through the intermediate refractive index portion.

2. A dispersion compensating optical fiber according to claim 1, wherein
   said intermediate refractive index portion is formed by doping to pure silica a dopant for increasing a refractive index such that a first specific refractive index difference Δ3 thereof relative to pure silica becomes 0.5% or more,
   said low refractive index portion is formed by doping to pure silica a dopant for reducing a refractive index such that a second specific refractive index difference Δ2 relative to pure silica becomes −0.3% or more, and also a value obtained by subtracting the first specific refractive index difference Δ3 of the intermediate refractive index portion from the second specific refractive index difference Δ2 becomes −0.8% or less,
   said core portion is formed by doping to pure silica a dopant for increasing a refractive index such that a value obtained by subtracting the first specific refractive index difference Δ3 of the intermediate refractive index portion from a third specific refractive index difference Δ1 relative to pure silica becomes 1.5% or more, and
   a slope rate obtained by dividing the dispersion slope by a value of the wavelength dispersion becomes 0.01 or more.

3. A dispersion compensating optical fiber according to claim 1, wherein said higher mode light eliminating portion is formed by continuously forming the intermediate refractive index portion up to the outermost layer of the optical fiber, to thereby eliminate higher mode optical components.

4. A dispersion compensating optical fiber according to claim 1, wherein
   when said dispersion compensating optical fiber includes a cladding portion, which is provided at the periphery of the intermediate refractive index portion and has a refractive index lower than that of the intermediate refractive index portion, said higher mode light eliminating portion is formed by connecting, to a predetermined position, an optical path having a mode field diameter smaller than that of an optical transmission path to which the dispersion compensating optical fiber is connected, so as to eliminate higher mode optical components.

5. A dispersion compensating optical fiber according to claim 4, wherein said optical path has a mode field diameter smaller than an inner diameter of said intermediate refractive index portion.

6. A dispersion compensating optical fiber according to claim 1, wherein:
   when said dispersion compensating optical fiber includes a cladding portion which is provided at the periphery of said intermediate refractive index portion, and has a refractive index lower than that of the intermediate refractive index portion,
   said higher mode light eliminating portion is formed by setting a refractive index of the periphery portion of the intermediate refractive index portion to be higher than that of the remaining portion of the intermediate refractive index portion, to thereby eliminate higher mode optical components.

7. A dispersion compensating optical fiber according to claim 1, wherein:
   when said dispersion compensating optical fiber includes a cladding portion which is provided at the periphery of said intermediate refractive index portion, and has a refractive index lower than that of the intermediate refractive index portion,
   said higher mode light eliminating portion is formed by providing the intermediate refractive index portion with an absorber for absorbing light of 1.55 μm band, to thereby eliminate higher mode optical components.

8. A dispersion compensating optical fiber according to claim 7, wherein said absorber is arranged in an area sufficiently separated from a mode field of a fundamental mode.

9. A dispersion compensating optical fiber according to claim 7, wherein said absorber is made of erbium.

* * * * *